United States Patent
Skubic et al.

(10) Patent No.: US 9,590,726 B2
(45) Date of Patent: Mar. 7, 2017

(54) MONITORING ENERGY CONSUMPTION IN OPTICAL ACCESS NETWORKS

(71) Applicant: TELEFONAKTIEBOLAGET L M ERICSSON (PUBL), Stockholm (SE)

(72) Inventors: Björn Skubic, Hässelby (SE); David Hood, Palo Alto, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 261 days.

(21) Appl. No.: 14/064,686

(22) Filed: Oct. 28, 2013

(65) Prior Publication Data
US 2014/0112662 A1  Apr. 24, 2014

Related U.S. Application Data (63) Continuation of application No. 12/859,642, filed on Aug. 19, 2010, now Pat. No. 8,600,231.

(51) Int. Cl.
| | | |
|---|---|---|
| H04J 14/00 | (2006.01) |
| H04B 10/079 | (2013.01) |
| H04B 10/272 | (2013.01) |
| H04Q 11/00 | (2006.01) |

(52) U.S. Cl.
CPC ..... *H04B 10/07955* (2013.01); *H04B 10/272* (2013.01); *H04Q 11/0067* (2013.01); *H04Q 2011/0083* (2013.01)

(58) Field of Classification Search
CPC ............ H04B 10/07955; H04B 10/272; H04Q 11/0067; H04Q 2011/0083
USPC ................................... 398/71, 72, 66, 67, 38
See application file for complete search history.

(56) References Cited

U.S. PATENT DOCUMENTS

| | | | |
|---|---|---|---|
| 8,000,602 B2 * | 8/2011 | Haran | H04Q 11/0067 398/67 |
| 8,014,674 B2 * | 9/2011 | Gao | H04J 3/1694 398/67 |
| 8,073,329 B2 | 12/2011 | Gao et al. | |
| 8,127,159 B1 * | 2/2012 | Chhabra et al. | 713/320 |
| 8,543,008 B2 * | 9/2013 | Soto et al. | 398/171 |
| 2005/0163504 A1 * | 7/2005 | Bernard et al. | 398/33 |

(Continued)

FOREIGN PATENT DOCUMENTS

| | | |
|---|---|---|
| EP | 1 793 514 A1 | 6/2007 |
| EP | 2 031 894 A1 | 3/2009 |

(Continued)

*Primary Examiner* — M. R. Sedighian (57) ABSTRACT

An optical access network comprises optical network units connected to a node. A monitoring unit determines information indicative of energy consumption at the optical network unit over a period of time. An optical network unit can operate in operating states/modes which differ in their energy consumption. Monitoring unit can determine the information by determining a time that an optical network unit spends in the different operating states/modes. Monitoring unit can use a state machine at the node which represents the optical network unit. An optical network unit can locally record time spent in states/modes and forward this to the monitoring unit. An optical network unit can locally monitor energy consumption and forward this to the monitoring unit. An operational parameters of the access network can be modified based on the information determined by the monitoring unit.

19 Claims, 8 Drawing Sheets

(56) References Cited

U.S. PATENT DOCUMENTS

| | | |
|---|---|---|
| 2007/0127923 A1 | 6/2007 | Dalton et al. |
| 2008/0212964 A1 | 9/2008 | Gao et al. |
| 2008/0292312 A1* | 11/2008 | Oron ................. H04B 10/0795 398/33 |
| 2009/0290868 A1 | 11/2009 | Yin |
| 2010/0111523 A1* | 5/2010 | Hirth et al. .................... 398/25 |
| 2010/0150546 A1* | 6/2010 | Shrikhande ............... H04J 3/14 398/10 |
| 2016/0099792 A1* | 4/2016 | Gao .................... H04J 14/0221 398/69 |

FOREIGN PATENT DOCUMENTS

| | | |
|---|---|---|
| WO | 2004/015948 A1 | 2/2004 |
| WO | WO 2009/094943 A1 | 8/2009 |

* cited by examiner

MONITORING ENERGY CONSUMPTION IN OPTICAL ACCESS NETWORKS

CROSS-REFERENCE TO RELATED APPLICATIONS

This application is a continuation of U.S. application Ser. No. 12/859,642, filed Aug. 19, 2010, pending, the disclosure of which is incorporated herein by reference.

TECHNICAL FIELD

This invention relates to optical access networks, such as passive optical networks (PON).

BACKGROUND

Increasing demand for a range of high-bandwidth communications services is driving a need for high-capacity access networks to provide those services. Optical access networks can deliver the high bandwidths now required. An optical access network typically has apparatus called an Optical Line Terminal (OLT) at a Central Office node. The OLT serves a plurality of optical terminals, called Optical Network Units (ONU). ONUs can be deployed at subscriber premises, at kerbside cabinets, or at other remote locations, depending on the access network architecture. A Passive Optical Network is a type of optical access network with limited, or no, power requirements in the optical path between the Central Office and ONUs. There are various types of passive optical network which differ in how the resources of the fibre are shared among ONUs. In a Time Division Multiplexing Passive Optical Network (TDM-PON), the resources of the fibre are shared on a time-divided basis among ONUs. Traffic in the downstream direction is broadcast by the OLT to all ONUs, with each ONU extracting traffic destined for itself. Each ONU served by the OLT is allocated time slots in which it can transmit data to the OLT. The time slots can occur at irregular intervals and can have irregular durations. In a Wavelength Division Multiplexed Passive Optical Network (WDM-PON), each ONU is allocated a different wavelength channel, called a lambda, for communication between the OLT and that ONU.

Techniques for reducing the energy consumption of optical access networks have been proposed. In TDM-PONs, energy is consumed by transceivers to keep the link between the ONU and OLT alive, regardless of traffic. It has been proposed to power off the ONU transceiver in a TDM-PON at times of no traffic to save energy.

One proposal is that an optical network unit (ONU) can autonomously enter a low-power state during times of inactivity. This means that an ONU decides for itself, without external control, when to enter a lower power state. Another proposal is that an external entity, such as an OLT, authorises an ONU to enter a lower power state at the discretion of the ONU. When the ONU decides to sleep, it signals to the OLT so the OLT can distinguish between the ONU being asleep and the ONU being at fault. One proposal for ITU-T G.987.3 is for two non-autonomous reduced-power modes referred to as cyclic sleep and doze mode. Cyclic sleep refers to the controlled powering off of the ONU transceiver during short time intervals. Doze mode refers to the controlled powering off of the ONU transmitter, while keeping the ONU receiver powered up and active.

Energy management typically presents a trade off between ONU energy savings and service quality (or QoS), and is something that is managed in a closed manner between the OLT and ONUs.

SUMMARY

A first aspect of the present invention provides a method of monitoring an optical access network comprising an optical network unit connected to a node. The method comprises, at a monitoring unit remote from the optical network unit, determining information indicative of energy consumption at the optical network unit over a period of time.

An advantage of embodiments of the invention is that an operator of the network is able to access information on the effects of energy management operations, such as energy consumed and energy saved. The information is useful for understanding the effect of energy management operations and allows an operator to understand to what extent it is worth sacrificing capacity or Quality of Service (QoS). This is particularly useful for power management states such as cyclic sleep and doze mode, which have a set of control parameters.

The optical network unit can comprise a plurality of different operating states, which differ in their power requirements. For example, there can be at least one state which has a lower power demand compared to a normal operating state. Advantageously, the step of determining information indicative of energy consumption at the optical network unit comprises determining a time spent in at least one of the operating states.

The term "state" can refer to an operating mode of an optical network unit (ONU), such as an energy management mode recited in ITU-T G.987.3, or to a specific state of a state machine which describes the behaviour of an ONU.

In an embodiment, the method comprises maintaining a state machine at the node comprising a plurality of different states, each state representing an operating state of the optical network unit connected to the node. The method further comprises determining the information indicative of energy consumption at the optical network unit from the state machine, such as monitoring a time spent in at least one of the states of the state machine.

In another embodiment, the method comprises comprising receiving, from an optical network unit, information indicative of energy consumption at the optical network unit, wherein the information has been calculated at an optical network unit. The information can be carried by (low-level) messages sent to the power control unit 30, or by (high-level) messages sent over a management interface of the PON.

A further aspect of the invention provides a method of operating an optical network unit in an optical access network. The method comprises determining information indicative of energy consumption at the optical network unit over a period of time. The method further comprises sending the information to a node of the optical access network.

An advantage of determining information locally at the optical network unit is that the optical network unit is able to more accurately determine information indicative of energy consumption, such as by monitoring time spent in different operating states, or by monitoring actual energy consumption.

Advantageously, the information is used to modify a control parameter of the power management module. The modifying, or "retuning", can be performed automatically, using the collected information.

Another aspect of the invention provides a monitoring unit for an optical access network comprising an optical network unit connected to a node. The monitoring unit is arranged to determine information indicative of energy consumption at the optical network unit over a period of time.

The monitoring unit can be located at a CO. There can be a separate monitoring unit per OLT, or per group of OLTs. Alternatively, the monitoring unit can be located remotely from the CO, such as at a management entity.

Another aspect of the invention provides an optical network unit for an optical access network. The optical network unit comprises a monitoring unit which is arranged to determine information indicative of energy consumption at the optical network unit over a period of time and send the information to a node of the optical access network.

The optical access network can be a TDM-PON, WDM-PON, point-to-point optical access network, or any other kind of optical access network.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection or pre-installed at a time of manufacture.

BRIEF DESCRIPTION OF THE DRAWINGS

Embodiments of the invention will be described, by way of example only, with reference to the accompanying drawings in which.

DETAILED DESCRIPTION

Figure 1:
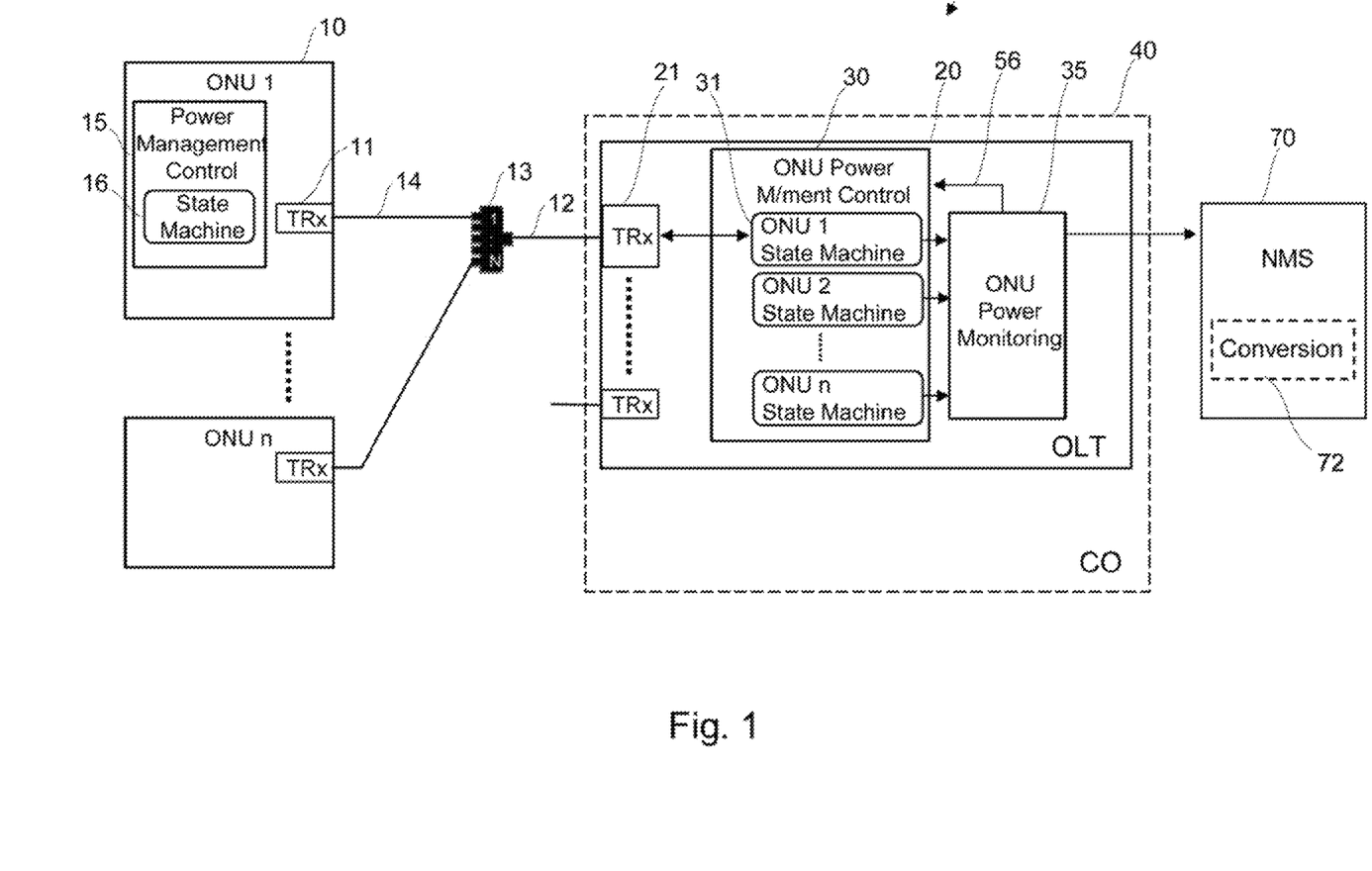
FIG. 1 shows an optical access network according to a first embodiment of the invention.

FIG. 1 shows a first embodiment of an optical access network 5 according to the present invention. The network comprises an Optical Line Terminal Unit (OLT) 20, typically located at a central office (CO) 40, and a plurality of remote Optical Network Units (ONU) 10. The OLT 20 has a transceiver 21 for optically communicating with a group of ONUs 10. The topology of the access network can comprise a tree and branch topology with a trunk fibre 12, splitter 13 and drop fibres 14 between splitter 13 and ONUs 10. An ONU has a transceiver 11. In the following description, the term "Passive Optical Network" (PON) will be used to describe an OLT 20 connected to a group of ONUs 10. There can be multiple PONs, each PON comprising an OLT 20 at the CO 40 which serves a group of ONUs 10.

In a Time Division Multiplexing Passive Optical Network (TDM-PON), the resources of the fibre 12 are shared on a time-divided basis among ONUs 10. Traffic in the downstream direction is broadcast by the OLT to all ONUs, with each ONU extracting traffic destined for itself. Each ONU served by the OLT is allocated time slots in which it can transmit data to the OLT. The time slots can occur at irregular intervals and can have regular, or irregular, durations. Typically, a scheduling function will allocate time slots to ONUs based on various criteria. In a Wavelength Division Multiplexed Passive Optical Network (WDM-PON), each ONU 10 is allocated a different wavelength channel, called a lambda, for communication between the OLT 20 and that ONU 10.

Figure 2:
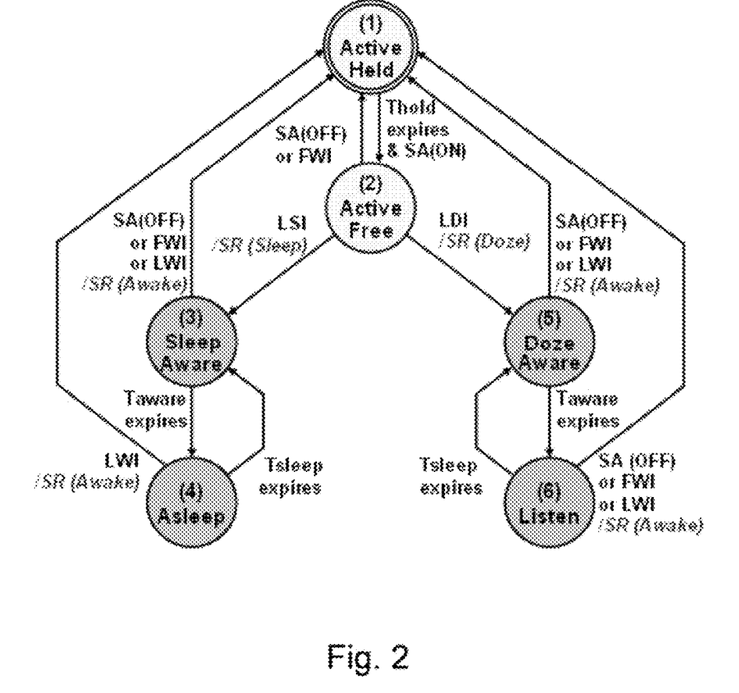
FIG. 2 shows a state diagram of power management states at an ONU of FIG. 1.
Figure 3:
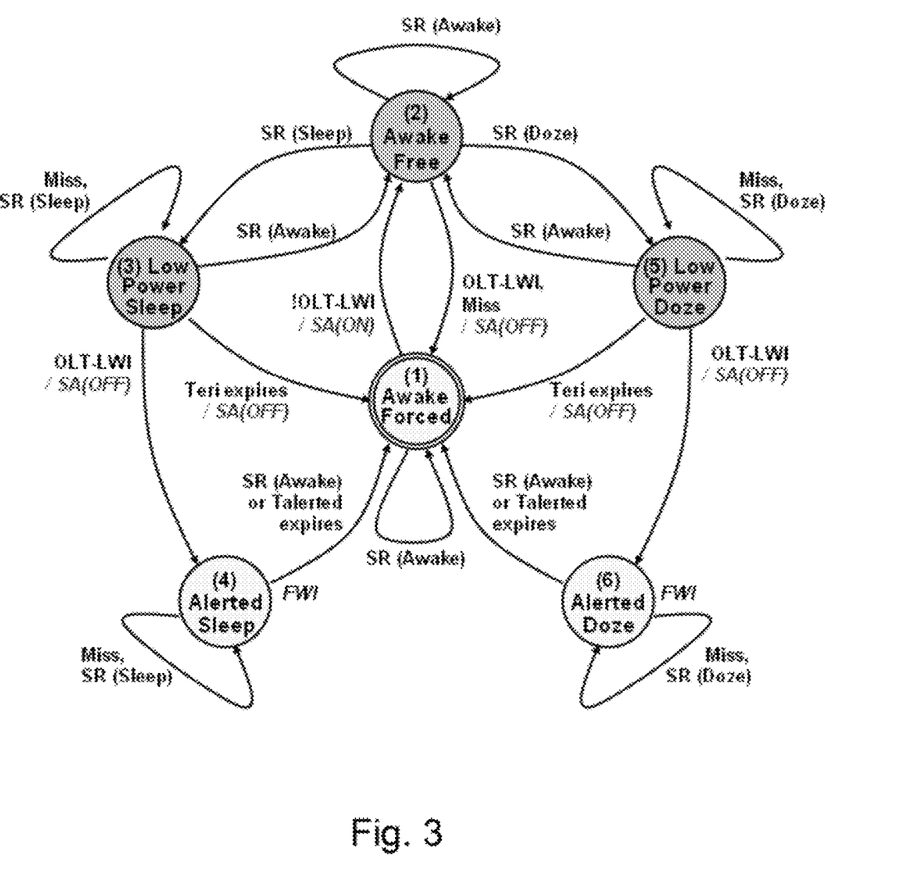
FIG. 3 shows a state diagram of power management states at an OLT of FIG. 1.

Power management functionality is provided within the PON. A power management control unit 30 is provided at the OLT 20 and a power management control unit 15 is provided at each ONU 10. The power management control units 15, 30 implement power management functions, such as those proposed in ITU-T G.987.3. Power management functions allow the ONUs 10, or parts of the ONUs (such as the transceivers 11) to reduce their energy consumption at certain times. Each ONU 10 operates in one of a set of possible power management modes at any given time. In G.987.3, the possible modes are: Full Power; (Low Power) Doze; (Low Power) Cyclic Sleep. The modes differ in their power requirements. Each power management mode can comprise one or more power management states. A way of controlling power management is to provide logic, such as a state machine 16, at each ONU. An ONU can move between the possible states in response to stimuli, such as signalling received from the power control unit 30 at the OLT 20 or local conditions at the ONU 10, such as expiry of a timer or subscriber traffic activity. Similarly, a state machine 31 or other control logic is provided at the OLT 20 for each of the remote ONUs 10 in the PON. FIG. 2 shows a power management state diagram for a state machine 16 at an ONU 10 of an XG-PON. The state machine 31 has a set of states, and transitions between states, in response to events or signalling sent to the ONU 10 or received from the ONU 10, or to other events such as timer expiration or traffic activity. FIG. 3 shows a power management state diagram for the state machine 31 maintained at an OLT for an ONU. The two state diagrams shown in FIGS. 2 and 3 operate in partial state alignment.

The following table gives a summary of the power management states at an ONU in G.987.3:

| State | Semantics |
| --- | --- |
| ActiveHeld | The ONU is fully responsive, forwarding downstream traffic and responding to all bandwidth allocations. Power management state transitions do not occur. |

-continued

| State | Semantics |
|---|---|
| ActiveFree | The ONU is fully responsive, forwarding downstream traffic and responding to all bandwidth allocations. Power management state transition requests are a local decision. |
| Asleep | The ONU shuts down both its receiver and transmitter, retaining the ability to wake up on local stimulus. |
| Listen | The ONU receiver is on; the transmitter is off. The ONU listens to the downstream signal and forwards downstream traffic, while retaining the ability to reactivate the transmitter on local stimulus or receipt of SA (off) from the OLT. |
| DozeAware SleepAware | Both ONU receiver and transmitter remain on. This state persists for a specified duration Iaware if not truncated by the arrival of a local stimulus LWI or receipt of SA (OFF) from the OLT. The ONU forwards downstream traffic and responds to all grant allocations. |

The following table gives a summary of the power management states at an OLT in G.987.3:

| State | Semantics |
|---|---|
| AwakeForced | The OLT provides normal allocations to ONU i, forwards downstream traffic, and expects a response to every bandwidth grant. The OLT declares the $LOS_i$ defect on detection of N missed allocations ($LOS_i$ soak count). On transition into this state, the OLT sends a Sleep_Allow (OFF) PLOAM message, thus revoking its permission to the ONU to enter a low power state. |
| AwakeFree | The OLT provides normal allocations to the ONU, forwards downstream traffic, expects a response to every bandwidth grant, and is ready to accept a power management transition indication from the ONU. |
| LowPowerDoze LowPowerSleep | The OLT supports the ONU in a low power state. The OLT provides normal allocations to the ONU but expects only intermittent responses from the ONU to bandwidth grants, as defined by various timers. |
| AlertedDoze AlertedSleep | The OLT attempts to wake up the ONU. |

A power monitoring unit 35 at the OLT 20 collects information indicative of energy consumption of an ONU 10, or a group of ONUs. The collected information can comprise values representing the ONU time spent in the various reduced power states over some specified period of time. The information could also comprise values representing some aspect of the ONU energy consumption over a specified period of time. The information compiled at the monitoring unit 35 over time can be presented as a function of time and/or as totals for some specified period of time, such as the past hour/day/week/month, or some other time period.

Information obtained by the power monitoring unit 35 can be output to another network entity, such as a network management system (NMS) 70. In an embodiment where the power monitoring unit 35 records values representing times spent in various power management modes/states, conversion of numerical values representing times to numerical values representing energy/power can be performed locally at the OLT (e.g. conversion unit 58 in FIG. 4, or the conversion can be performed at another network entity (e.g. at conversion unit 72 in part of a Network Management System in FIG. 1). Conversion units 58, 72 can perform the conversion by using stored data which gives, for each mode/state, an energy value per unit time spent in that state. A numerical value of energy saved can be calculated by deducting the amount of energy used (as calculated by unit 35 or unit 72) from an amount of energy which would nominally be used if the access network were operated continuously in full-power mode.

Figure 4:
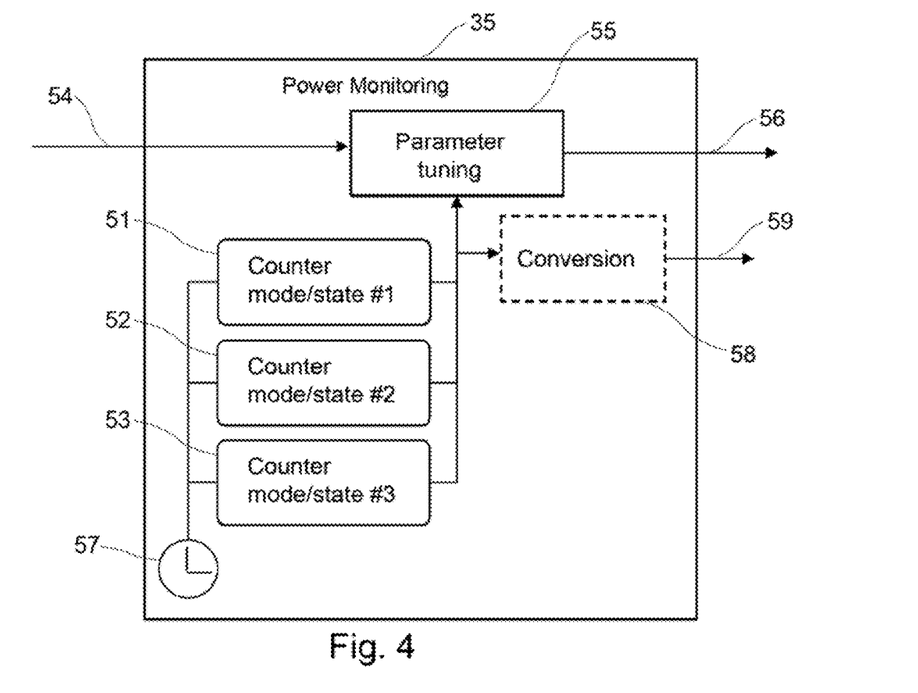
FIG. 4 shows a monitoring unit used in the Central Office of FIG. 1.

Two alternative ways of determining energy consumption will be described. In a first way, shown in FIG. 1, power monitoring unit 35 determines information which is indicative of energy consumption of an ONU 10, or a group of ONUs, by monitoring the power management states locally at the OLT 20. Depending on the implemented signalling scheme for the power management functions, it is possible for the OLT 20 to access accurate, or approximate, information on the time that each ONU 10 spends in each of the various reduced power states. In ITU G.987.3, power management is implemented by signalling messages carried by a physical layer Operations, Administration and Maintenance (PLOAM) messaging channel. The state machine 31 corresponding to each ONU 10 is updated in response to signalling messages (e.g. the PLOAM signalling messages relating to power management) between the ONU 10 and OLT 20. The state machine 31 corresponding to an ONU 10 can also be updated in response to receiving "keep-alive" traffic. The OLT needs to periodically check that an ONU 10 is still alive (and in a low-power mode), and has not failed. One way of performing this check is to exchange handshake signalling messages. Another way is by a "keep-alive" traffic exchange. Power monitoring unit 35 monitors the OLT state, as indicated by the state machine 31 corresponding to that ONU 10. Power monitoring unit 35 monitors the time spent in each state and can, for example, maintain a set of counters corresponding to the possible modes or states. Each counter records time spent in one of the power management modes: "Full Power", "Low Power Doze", "Low Power Sleep", or time spent in one of the individual states of the state machine. Each counter can have, for example, a time resolution of 1 µs, a coarser granularity such as 125 µs, or any other granularity which is found to be useful. FIG. 4 shows a power monitoring unit 35 with a set of counters 51, 52, 53. A larger, or smaller, number of counters can be provided to match the number of modes/states used for power management. Power monitoring unit 35 can apply corrections to the recorded values held by the counters to account for factors such as propagation delay, grace periods etc. As an example, the transition from the "Full Power" state to the "Low Power Sleep" state is known from OLT transition from "Awake Free" to "Low Power Sleep" (reception of a SR sleep) minus the propagation delay plus the grace period.

Figure 5:
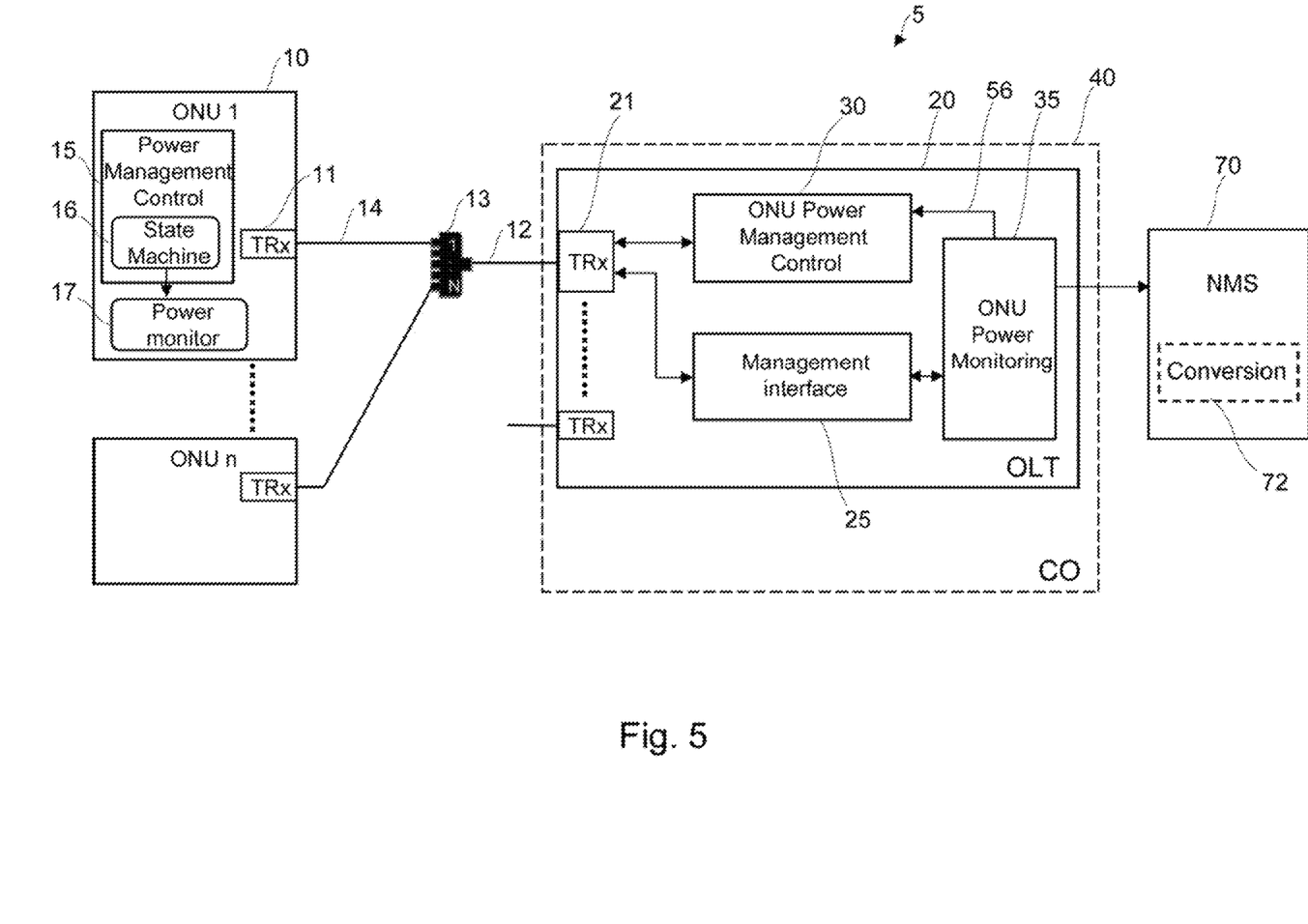
FIG. 5 shows an optical access network according to a second embodiment of the invention.

FIG. 5 shows a second way of determining energy consumption. A power monitoring unit 17 is provided at each ONU 10 for locally collecting information indicative of energy consumption at the ONU 10. The power monitoring unit 17 can, for example, comprise a set of counters, each counter recording time spent in one of the three power management modes: "Full Power", "Low Power Doze", "Low Power Cyclic Sleep". "Full Power" mode corresponds to time spent in any of the active states of FIG. 2. "Low Power Doze" corresponds to time spent in the "doze aware" and "listen" states of FIG. 2. "Low Power Cyclic Sleep" corresponds to time spent in the "sleep aware" and "asleep" states of FIG. 2. In an alternative embodiment, a counter can be provided to record time spent in an individual state of the state machine, e.g. a counter to record time spent in "doze aware" state, another counter to record time spent in "listen" state, and so on. The power monitoring unit 17 may perform corrections for effects that are not directly observable from the state machine, for example the time required to periodically power up transceiver 11 for keep-alive exchanges. Power monitoring unit 17 receives inputs from a state machine 16 at the power management control unit 15. FIG.

Figure 6:
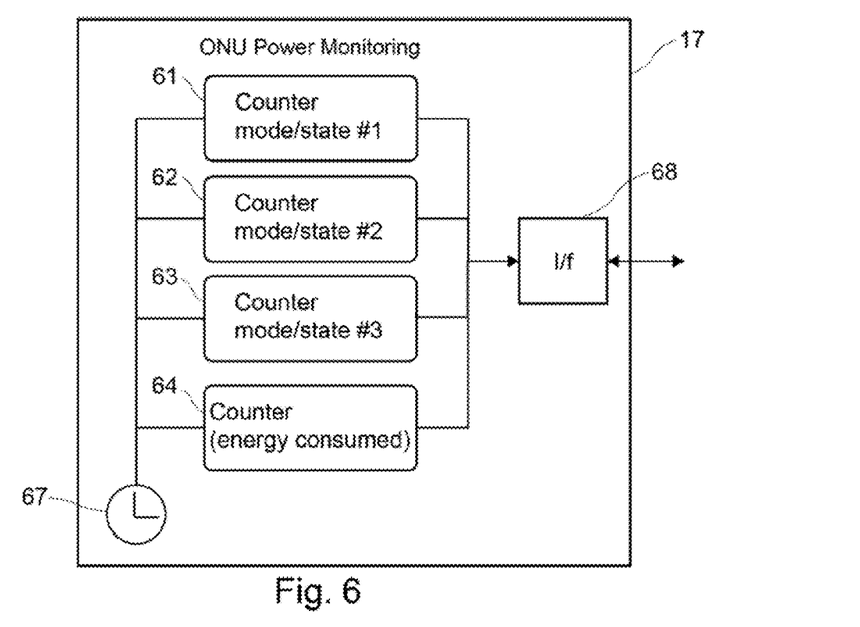
FIG. 6 shows a monitoring unit used in an ONU of FIG. 1.

6 shows a power monitoring unit 35 with a set of counters 61, 62, 63. A larger, or smaller, number of counters can be provided to match the number of modes/states used for power management. The "Low Power Doze", "Low Power Sleep" counters are updated by means of the reference clock 67, which is maintained at each ONU using synchronization information distributed by the OLT 20 to all ONUs 10. The power monitoring unit 17 can comprise a counter 64 to record an amount of energy consumed by the ONU 10. Counter 64 can record any suitable units of energy measurement, such as Watt-seconds or milliwatt-seconds. Counter 64 can be provided instead of, or in addition to, counters 61-63. Information gathered by power monitoring units 17 at each ONU 10 is forwarded to the power monitoring unit 35 at the OLT 20 via an interface 68. The information can be carried by (low-level) messages sent to the power control unit 30, such as PLOAM messages. Alternatively, the information can be carried by (high-level) messages sent over a management interface of the PON, such as the ONU management and control channel interface (OMCC) defined in ITU-T G.988. FIG. 5 shows a management interface unit 25, which can receive messages from transceivers 21 and forward information in the messages to the power monitoring unit 35.

In G.988 a set of managed entities is defined. An embodiment of the invention creates a managed entity to collect performance monitoring data associated with the ONU's energy/power consumption. An instance of this managed entity is associated with the ONU in its entirety. The following attributes can be defined Interval end time: this attribute identifies the most recently finished monitoring interval. The interval can be any desired value. A typical value is 15 minutes.

Doze time: this attribute records the time during which the ONU was in doze energy conservation mode. This can be measured in microseconds.

Cyclic sleep time: this attribute records the time during which the ONU was in cyclic sleep energy conservation mode. This can be measured in microseconds.

Energy consumed: this attribute records the energy consumed by the ONU. This can be measured in milliwatt-seconds.

The attributes listed above are carried in management layer (e.g. OMCI) messages between the ONU and OLT.

In the above embodiment, only time spent in each of the low-power modes is signalled. The amount of time spent in the full-power mode can be calculated by subtracting the time spent in the low-power modes from the known interval duration. In an alternative embodiment, the time spent in each mode (i.e. full-power modes and low-power modes) can be individually signalled.

Power management of the ONUs is controlled by a set of parameters. In G.987.3 the parameters include:

| Parameter | Description | Defined by | Known to |
|---|---|---|---|
| Isleep | Isleep is the maximum time the ONU spends in its Asleep or Listen states, as a count of 125 microsecond frames. Local wakeup indications (LWIs) in both Asleep and Listen states or remote events in Listen state may truncate the ONU's sojourn in these states. | OLT | ONU, OLT |
| Tsleep | Local timer at ONU. Upon entry to Asleep state, the ONU initializes Tsleep to a value equal to or less than Isleep. | ONU | ONU |

-continued

| Parameter | Description | Defined by | Known to |
|---|---|---|---|
| | Secondary internal timers may be required to guarantee that the ONU will be fully operational when it enters sleep aware state after an interval not to exceed Isleep. | | |
| Iaware | Iaware is the minimum time the ONU spends in its Aware state before transitioning to a low power state (Asleep or Listen), as a count of 125 microsecond frames. During the Iaware interval, local or remote events may independently cause the ONU to enter the ActiveHeld state rather than returning to a low power state. | OLT | ONU, OLT |
| Taware | Local timer at ONU, initialized to a value equal to or greater than Iaware once downstream synchronization is obtained upon entry to Aware state. Taware controls the dwell time in aware state before the ONU re-enters one of the low power states. | ONU | ONU |
| Itransinit | Complete transceiver initialization time: the time required for the ONU to gain full functionality when leaving the Asleep state (i.e., turning on both receiver and transmitter). | ONU | ONU, OLT |
| Itxinit | Transmitter initialization time: the time required for the ONU to gain full functionality when leaving the Listen state. | ONU | ONU, OLT |
| Talerted | Local timer to bound the time that the OLT state machine remains in an alerted state before entering the AwakeForced state. | OLT | OLT |
| $Clos_i$ | Counter of missing upstream bursts in OLTs AwakeForced(i) state for loss of signal defect for ONU i. | OLT | OLT |
| $Ter_i$ | Local handshake timer at the OLT that defines the latest instant at which an upstream burst is expected from sleeping or dozing ONU i. | OLT | OLT |
| Ihold | Minimum sojourn in the ActiveHeld state. | OLT | ONU, OLT |
| Thold | Local timer at the ONU that is initialized to Ihold upon transmission of SR(Awake) after entry into ActiveHeld state and that enforces the minimum sojourn in the ActiveHeld state. | ONU | ONU |

Any of the parameters used as part of the power management of the PON can be modified, or "tuned", in response to the collected information about energy consumption. Referring again to FIG. 4, this shows a parameter tuning module 55 which receives inputs from the counters 51, 52, 53, indicative of time spent in the various power states, and/or the information collected locally at ONUs and received via the management interface. Module 55 also receives inputs 54 from the ONU power control unit 30, such as current parameter values. Module 55 adapts values of one or more of the power management parameters based on the inputs. Module 55 can also determine whether to enable energy saving (or simply to operate continuously in full-power mode), and which reduced power mode(s) to use.

Information obtained by the power monitoring unit 35 can be used to assess the effect of low-power power management modes on the subscriber quality of service, e.g. in terms of lost packets or application time-outs. These effects can be evaluated by machines, or by humans, using additional information available at a management server. Information obtained by the power monitoring unit 35 can be used to automate a time of day QoS adjustment (e.g. lower QoS during early hours of the day).

Module 55 is capable of automatically tuning the power management parameters, without user intervention. Alternatively, outputs of the power monitoring unit 35 can be output to another network entity, and the external entity can modify the value of a parameter.

Figure 7:
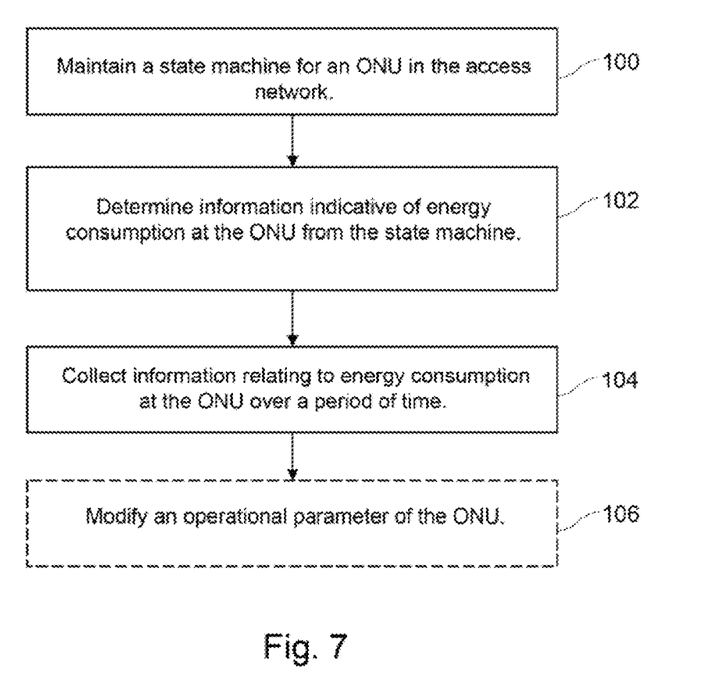
FIG. 7 shows a method performed by a monitoring unit at the Central Office.
Figure 8:
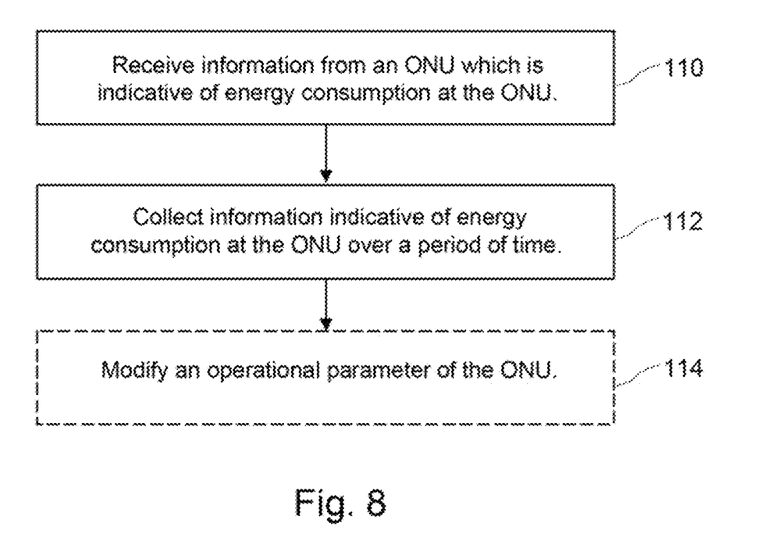
FIG. 8 shows an alternative method performed by a monitoring unit at the Central Office.

FIGS. 7 and 8 show methods performed by the power control unit 30 and power monitoring unit 35 at the Central Office. FIG. 7 shows a first method performed at the Central Office. A state machine is maintained for an ONU in the access network (step 100). A state machine is maintained for each ONU in the PON. Step 102 determines information indicative of energy consumption at the ONU from the state machine maintained at step 100. Step 102 can increment a counter for each time unit (e.g. 125 μs) spent in each power management mode/state. The information is collected over a period of time (step 104). Optionally, at step 106, the method modifies an operational parameter of the ONU based on the collected information. Step 106 can comprise signalling to the ONU to modify the parameter.

FIG. 8 shows a second method performed at the Central Office. At step 110 information is received from an ONU. The information is indicative of energy consumption at the ONU. The information can be received via a management interface such as OMCI. The information received at step 110 can appear at the conclusion of a collection interval, and may be reported immediately to a management system, rather than further stored at the OLT 20. Optionally, the information is collected over a period of time (step 112). Optionally, at step 114, the method modifies an operational parameter of the ONU based on the collected information. Step 114 can comprise signalling to the ONU to modify the parameter.

Figure 9:
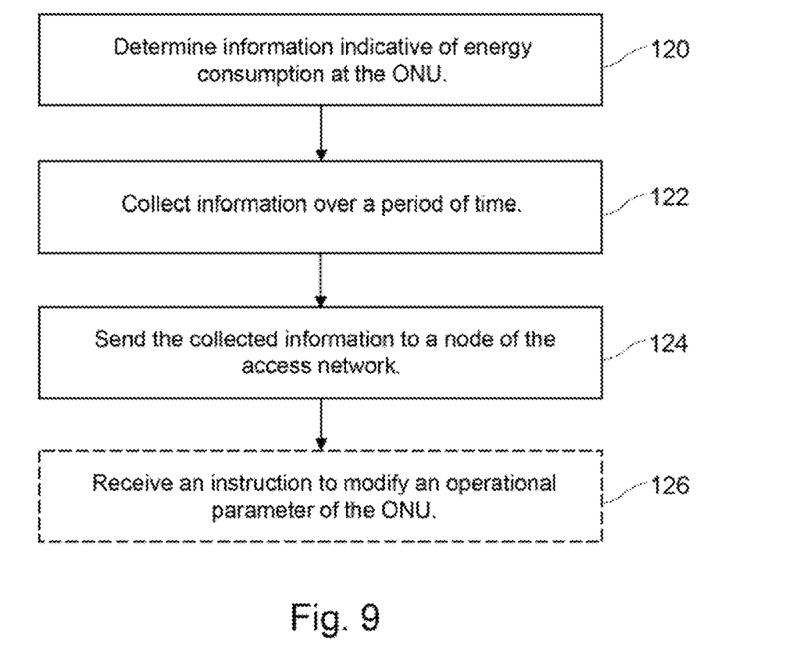
FIG. 9 shows a method performed by a monitoring unit at an ONU.

FIG. 9 shows a method performed by a power management control unit 15 and power monitoring unit 17 at the ONU. At step 120 the method determines information which is indicative of energy consumption at the ONU. Step 120 can comprise incrementing a counter of time spent in a power management state or it can comprise incrementing a counter of actual energy consumption, such as a watt-second count. The information is collected over a period of time (step 122). Step 124 sends the collected information to a node of the access network, such as the OLT 20. The information can be sent via a signalling message over the management interface. Optionally, at step 126, the ONU receives a signalling message to modify an operational parameter of the ONU.

In FIGS. 1 and 5 a monitoring unit 35 is shown as part of an OLT 20. A monitoring unit 35 can be provided on a per OLT basis, as shown in FIGS. 1 and 5, or it can be provided per group of OLTs. In a further alternative, the monitoring unit 35 can be located in another network entity.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of monitoring an optical network unit, the method comprising:
    obtaining signalling from an optical network unit indicating an operating state of the optical network unit;
    obtaining, at an optical line terminal, timing information indicative of energy consumption of the optical network unit over a period of time, the timing information based on the signalling indicating the operating state of the optical network unit, wherein the optical network unit has a plurality of different operating states and the step of obtaining timing information indicative of energy consumption at the optical network unit comprises recording, via at least two counters, a plurality of times spent by the optical network unit in at least two of the operating states, each of the at least two counters associated with a different operating state.

2. The method according to claim 1, wherein the step of recording a time spent in at least one of the operating states comprises recording a time the optical network unit spent in a doze mode and recording a time the optical network unit spent in a cyclic sleep mode.

3. The method according to claim 1, further comprising:
    maintaining a managed entity to obtain said information indicative of energy consumption of the optical network unit.

4. The method according to claim 3, wherein the managed entity has an attribute to record a time the optical network unit spent in a doze mode and an attribute to record a time the optical network unit spent in a cyclic sleep mode.

5. The method according to claim 3, wherein the managed entity has an attribute to record the energy consumed by the optical network unit.

6. The method according to claim 3, wherein an instance of the managed entity is associated with the optical network unit in its entirety.

7. The method according to claim 3, further comprising creating the managed entity to collect performance monitoring data associated with the energy consumption of the optical network unit.

8. The method according to claim 1, wherein said time spent in at least one of the operating states is measured in microseconds.

9. The method according to claim 1, wherein said period of time is 15 minutes.

10. The method according to claim 1, wherein the optical line terminal obtains the information indicative of energy consumption at the optical network unit without obtaining information indicative of actual energy consumption.

11. The method according to claim 10, wherein the optical line terminal transmits the obtained timing information to a remote network entity.

12. An optical network unit, comprising
    a monitoring unit arranged to collect timing information indicative of energy consumption of the optical network unit over a period of time, wherein the optical network unit has a plurality of different operating states and the monitoring unit is arranged to collect timing information indicative of energy consumption at the optical network unit by recording, via at least two counters, a plurality of times spent by the optical network unit in at least two of the operating states, each of the at least two counters associated with a different operating state;
    transmitting the timing information to an optical line terminal.

13. The optical network unit as claimed in claim 12, wherein the monitoring unit is a managed entity.

14. The optical network unit as claimed in claim 13, wherein the managed entity has an attribute to record a time the optical network unit spent in a doze mode and an attribute to record a time the optical network unit spent in a cyclic sleep mode.

15. An optical line terminal, comprising:
a transceiver configured to receive signalling from an optical network unit indicating an operating state of the optical network unit;
a monitoring unit arranged to obtain timing information indicative of energy consumption of the optical network unit over a period of time, wherein the optical network unit has a plurality of different operating states and the monitoring unit is arranged to obtain information indicative of energy consumption at the optical network unit by recording, via at least two counters, a plurality of times spent in at least two of the operating states, the at least two counters each associated with a different operating state.

16. The optical line terminal as claimed in claim 15, wherein the monitoring unit is a managed entity.

17. The optical line terminal as claimed in claim 16, wherein the managed entity has an attribute to record a time the optical network unit spent in a doze mode and an attribute to record a time the optical network unit spent in a cyclic sleep mode.

18. A method of monitoring an optical network unit, the method comprising:
collecting at an optical network unit timing information indicative of energy consumption of the optical network unit over a period of time, wherein:
the optical network unit has a plurality of different operating states; and
the step of collecting timing information indicative of energy consumption at the optical network unit comprises recording, via a plurality of counters, a plurality of times spent by the optical network unit in at least two of the operating states, each of the at least two counters associated with a different operating state; and
a transceiver configured to transmit the timing information to an optical line terminal.

19. The method according to claim 18, wherein the optical network unit collects the timing information indicative of energy consumption at the optical network unit without collecting information indicative of actual energy consumption.

* * * * *

UNITED STATES PATENT AND TRADEMARK OFFICE
CERTIFICATE OF CORRECTION

PATENT NO. : 9,590,726 B2
APPLICATION NO. : 14/064686
DATED : March 7, 2017
INVENTOR(S) : Skubic et al.

Page 1 of 2

It is certified that error appears in the above-identified patent and that said Letters Patent is hereby corrected as shown below:

On the Title Page

In Item (57), under "ABSTRACT", in Column 2, Line 14, delete "parameters" and insert -- parameter --, therefor.

In the Drawings

In Fig. 3, Sheet 3 of 8, delete " *!OLT-LWI / SA(ON)* " and insert -- *OLT-LWI / SA(ON)* --, therefor.

In the Specification

In Column 1, Line 9, delete "2010, pending," and insert -- 2010, now Pat. No. 8,600,231, --, therefor.

In Column 2, Lines 46-47, delete "comprises comprising" and insert -- comprises --, therefor.

In Column 5, Line 60, delete "4, or" and insert -- 4), or --, therefor.

In Column 6, Line 12, delete "ITU" and insert -- ITU-T --, therefor.

In Column 6, Line 14, delete "physical layer" and insert -- Physical Layer --, therefor.

In Column 6, Line 64, delete "example" and insert -- example, --, therefor.

In Column 9, Line 21, delete "At step 110" and insert -- At step 110, --, therefor.

In Column 9, Line 35, delete "At step 120" and insert -- At step 120, --, therefor.

Signed and Sealed this
Tenth Day of October, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,590,726 B2

In Column 9, Line 47, delete "and 5" and insert -- and 5, --, therefor.

In the Claims

In Column 10, Line 50, in Claim 12, delete "comprising" and insert -- comprising: --, therefor.